United States Patent [19]

Kuddes

[11] Patent Number: 5,778,447
[45] Date of Patent: Jul. 7, 1998

[54] SYSTEM AND METHOD FOR FAST MEMORY ACCESS USING SPECULATIVE ACCESS IN A BUS ARCHITECTURE SYSTEM

[75] Inventor: David W. Kuddes, Richardson, Tex.

[73] Assignee: Alcatel Network Systems, Inc., Richardson, Tex.

[21] Appl. No.: 856,347

[22] Filed: May 14, 1997

Related U.S. Application Data

[63] Continuation of Ser. No. 340,815, Nov. 17, 1994, abandoned, which is a continuation of Ser. No. 876,635, Apr. 30, 1992, abandoned.

[51] Int. Cl.$^6$ .................................................. G06F 12/06
[52] U.S. Cl. ..................... 711/169; 711/105; 711/204; 395/387
[58] Field of Search ........................ 711/105, 137, 711/204, 168, 169; 395/387

[56] References Cited

U.S. PATENT DOCUMENTS

| | | | |
|---|---|---|---|
| 4,142,233 | 2/1979 | Suzuki | 365/222 |
| 4,847,758 | 7/1989 | Olson et al. | 395/460 |
| 5,007,011 | 4/1991 | Murayama . | |
| 5,020,020 | 5/1991 | Pomfret et al. | 395/800 |
| 5,239,638 | 8/1993 | Pawlowski et al. | 395/425 |
| 5,297,091 | 3/1994 | Blake et al. | 364/203 |
| 5,305,433 | 4/1994 | Franzo | 395/325 |
| 5,353,429 | 10/1994 | Fitch | 395/494 |
| 5,457,779 | 10/1995 | Iwamura et al. | 395/494 |
| 5,485,589 | 1/1996 | Kocis et al. | 395/421.03 |

OTHER PUBLICATIONS

Intel, 85C090, 24–Macrocell CHMOS, PLD, (Oct., 1991) pp. 2-91-2-112.

*Primary Examiner*—Eddie P. Chan
*Assistant Examiner*—Hiep T. Nguyen
*Attorney, Agent, or Firm*—Vinson & Elkins L.L.P.

[57] ABSTRACT

A data processing system including dynamic random access memory (DRAM) in a bus architecture is disclosed. A controller is included in the system which unconditionally generates the row address strobe (RAS_) and column address strobe (CAS_) signals to the DRAM responsive to the initiation of a bus cycle. The controller also includes a decoder which decodes the address value during the DRAM cycle initiated by the RAS_ and CAS_ signals, and generates the select signals (for example, output enable and write enable signals, depending upon whether the access is a read or a write) if the address value indicates that the bus operation is to be a DRAM access. No select signal is generated in the event that the bus operation is not a DRAM access, so that the DRAM operation initiated by the RAS_ and CAS_ signals remains an internal operation and does not affect the common data bus. The effective DRAM system cycle time is reduced because all bus operations assume that the operation is a DRAM access; no DRAM access is delayed by the decoding of the address value.

19 Claims, 3 Drawing Sheets

SYSTEM AND METHOD FOR FAST MEMORY ACCESS USING SPECULATIVE ACCESS IN A BUS ARCHITECTURE SYSTEM

RELATED APPLICATIONS

This application is a continuation of application Ser. No. 08/340,815, filed Nov. 17, 1994, which is a continuation of application Ser. No. 07/876,635, filed Apr. 30, 1992, both entitled "A SYSTEM AND METHOD FOR FAST MEMORY ACCESS IN A BUS ARCHITECTURE SYSTEM, " both of which are now abandoned.

This application is related to U.S. Pat. No. 5,418,920, entitled "Method and Apparatus for Performing Dynamic Memory Refresh in a Data Processing System", also by David W. Kuddes, and commonly assigned with this application.

This invention is in the field of data processing systems, and more particularly is directed to memory access therein.

BACKGROUND OF THE INVENTION

Many modern data processing systems utilize dynamic random access memory (DRAM) integrated circuits for main solid-state data storage, due to the high density and low cost storage provided by this technology in which a single capacitor and a single access transistor comprise a DRAM storage cell. Because of the simple construction of the DRAM cell, the silicon area required to fabricate a given number of DRAM cells, and thus the cost per bit of DRAM memory, is much smaller than that required for other types of memory. For example, conventional static random access memory (SRAM) storage cells are constructed as cross-coupled inverters with access transistors, generally requiring either six transistors, or alternatively four transistors and two resistors, each implementation requiring more silicon area per bit than in the DRAM. Accordingly, modern data processing systems and functions that require large memory capacity, for example millions of bytes, often use DRAM integrated circuits to implement such storage.

In addition to the high density and low cost advantages, DRAM memory can generally be operated at lower levels of power dissipation per bit than can static memory. This is because much of the circuitry internal to the DRAM, such as sense amplifiers and decoding circuitry, operates dynamically in response to externally applied clock signals. Accordingly, DRAM power dissipation tends to occur at particular points in an operating cycle, rather than at a high constant DC level as is the case for fully static SRAM memory.

However, DRAM memories with dynamic operation require a longer minimum cycle time than do fully static SRAM memories, since a precharge operation must be performed at the end of each access cycle to prepare for the next dynamic operation. Furthermore, many modern SRAMs are extremely fast, having access and cycle times of on the order of 10 nsec for BiCMOS or ECL SRAMs, while the fastest DRAMs have access times of on the order of 60 nsec and cycle times of on the order of 110 nsec. As a result, the decision concerning whether to use DRAM or SRAM memory requires a tradeoff between low cost and low power dissipation (favoring DRAM memory) and faster cycle and access times (favoring SRAM memory).

By way of further background, many conventional data processing systems are constructed in such a manner that memory and several data processing circuits are interconnected by way of a bus. In such systems, where more than one circuit may obtain control of the bus, overall system performance is degraded during those times when one of the circuits (a "bus master") must wait for another bus master to complete its operation and release the bus. The time required to perform bus operations therefore has an impact on overall system performance. A particularly sensitive type of data processing system to this issue are those systems used in communications, such as local-area-network (LAN) controllers. In these systems, several data processing circuits, such as microprocessors, are connected to the bus and effect high speed data communication by transferring data among one another via the bus, for example by way of direct memory access (DMA). The bus traffic in such systems will generally be quite heavy; in addition, many messages may be quite long, occupying the bus for relatively long contiguous blocks of time.

As a result, memory accesses that require long cycle times are deleterious to the overall system performance, particularly where a DMA operation of a large data block is being performed between one of the circuits and DRAM memory. The cost and power advantages of DRAM over SRAM are thus available only at a cost of still further reduced system performance in such bus architecture systems.

It is therefore an object of the present invention to provide a method, and circuitry for performing the same, for accessing DRAM in a bus architecture system in such a manner that the effective cycle time is reduced.

It is a further object of the present invention to provide such a method and such circuitry to provide such access which is relatively simple and which does not unduly complicate the system or bus control.

It is a further object of the present invention to provide such a method and such circuitry which obtains such access at minimum power dissipation penalty.

Other objects and advantages will be apparent to those of ordinary skill in the art having reference to the following specification together with the drawings.

SUMMARY OF THE INVENTION

The invention may be implemented into a bus architecture data processing system including a decoder for determining the type of bus operation being performed. Upon the initiation of each bus cycle, the address value on the bus is assumed to be a DRAM address, and the appropriate clocks are generated and applied to the DRAM, regardless of the actual operation being performed. At such time as the decoder determines that the bus operation is a DRAM access, the DRAM then is enabled by way of select signals (such as output enable or write enable, depending upon the operation). If the decoder determines that the bus operation is not a DRAM access, the select signals are not generated; the DRAM merely performs an internal operation in such a case, with no communication relative to the bus. In this manner, a DRAM access is initiated from the beginning of each bus cycle, so that the access is not delayed by the instruction decoding operation.

DETAILED DESCRIPTION OF THE PREFERRED EMBODIMENT

Figure 1:
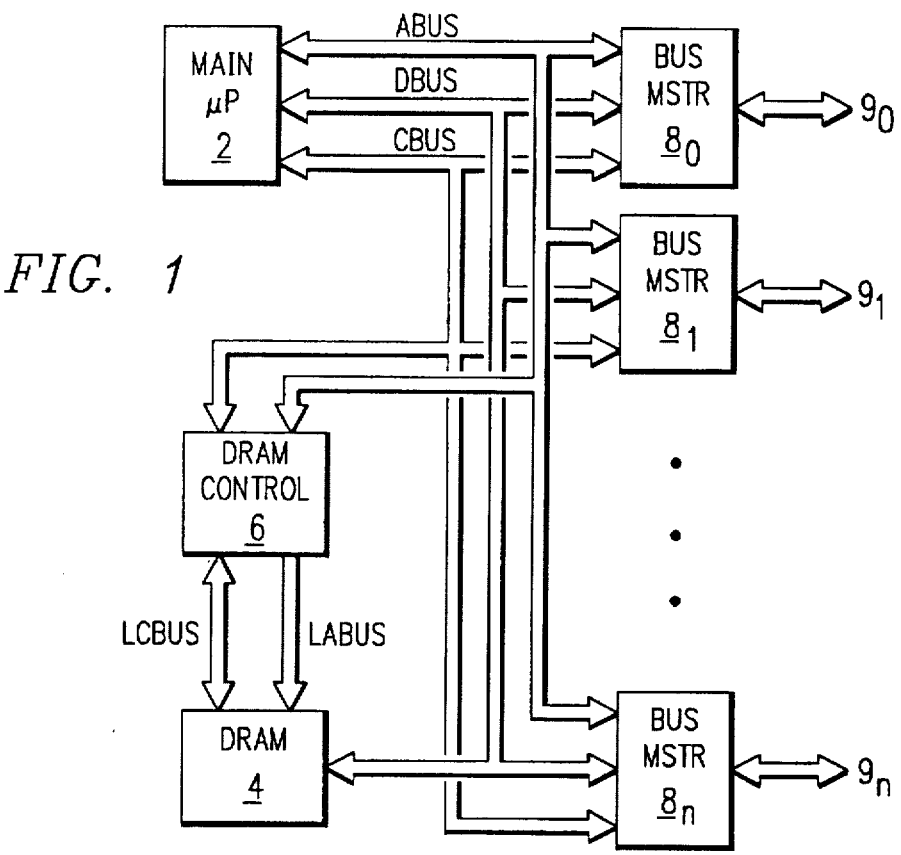
FIG. 1 is an electrical diagram, in block form, of a system incorporating the preferred embodiment of the invention.

Referring first to FIG. 1, a typical system which can especially benefit from the present invention will be described. The system of FIG. 1 corresponds to a local-area-network (LAN) controller port, but may alternatively correspond to other bus architecture data processing systems in which one of several circuits may obtain control of a common bus. Of course, the-system context of FIG. 1 is not to be construed in a limiting fashion, as the present invention is also useful in data processing systems having other architectures. However, it is contemplated that the present invention is particularly useful in a bus architecture system as shown in FIG. 1.

In the system of FIG. 1, main microprocessor 2 is connected to address bus ABUS, data bus DBUS, and control bus CBUS, and serves as the host CPU for the system. Main microprocessor 2 is of conventional type, such as a MC68340 microprocessor manufactured and sold by Motorola, and controls the system in the desired manner. Data bus DBUS is connected directly to dynamic random access memory (DRAM) 4. DRAM 4 preferably includes multiple DRAM integrated circuits arranged as one or more memory banks in the conventional manner; an example of conventional DRAM chips useful in DRAM 4 are modern 1 M×4 DRAM chips, such as the MCM514400A and MCM51L4400A CMOS Dynamic RAMs available from Motorola. Control bus CBUS is received by DRAM control circuit 6, which processes certain of the control signals in bus CBUS and controls the operation of DRAM 4 by way of local control bus LCBUS. Contained within local control bus LCBUS, and generated by DRAM control circuit 6, are signals such as column address strobe CAS__, row address strobe RAS__, read/write control R/W__, output enable signal G__ (the __ indicating that the signal is active when at a low logic level), and other conventional DRAM control signals. In addition, address bus ABUS is received by DRAM control circuit 6, which in turn applies a portion of the address value thereon to DRAM 4 in time-multiplexed fashion on local address bus LABUS, in combination with the appropriate address strobe signals on local control bus LCBUS.

As is well known, conventional DRAM circuits access a selected bit by first decoding the row address, and then sensing the data state of all memory cells in the selected row, prior to selecting the desired column to which the access is directed. As a result, the time-multiplexed application of row and column addresses to the same terminals, with row address strobe (RAS__) and column address strobe (CAS__) signals indicating which address is present, does not lengthen the cycle time from that which would be obtainable if the address were applied in non-multiplexed fashion. The number of pins required for the DRAM circuit can be significantly reduced by such multiplexing, however, and as such virtually all modern DRAMs are implemented with time-multiplexed row and column addressing.

DRAM control circuit 6 may also include refresh control circuitry 10 that monitors the number of refresh operations needed in order to place DRAM 4 in a fully refreshed state, monitors the refresh operations actually performed, and controls the performing of refresh operations. An example of such control is described in the above-referenced U.S. Pat. No. 5,418,920 entitled "Method and Apparatus for Performing Dynamic Memory Refresh in a Data Processing System").

In the system of FIG. 1, multiple bus masters $8_0$ through $8_n$ are also connected to address bus ABUS, data bus DBUS, and control bus CBUS. For the example of a LAN controller, six bus masters $8_0$ through $8_5$ may be provided, each which may be of a different type and manufacturer, for receiving data from and communicating data to various other functions and systems by way of buses $9_0$ through $9_n$ respectively. Examples of bus masters $8_0$ through $8_n$ include LAN controllers available from Intel for communicating digital data according to IEEE standard 802.3 over coaxial cable, twisted pair wire, and the like, and also LAN controllers available from Motorola, such as the Motorola LAPD controller. Each of bus masters $8_0$ through $8_n$ are capable of accessing buses ABUS, DBUS, CBUS, for communicating digital data thereupon to one of the other residents of buses ABUS, DBUS, CBUS, including to other ones of bus masters $8_0$ through $8_n$, to main processor 2, and to DRAM 4. A typical communication method for bus masters $8_0$ through $8_n$ is direct memory access (DMA).

Traffic on buses ABUS, DBUS, CBUS may often be quite heavy in the system of FIG. 1, considering the multiple bus masters $8_0$ through $8_n$ together with main processor 2 and DRAM 4, especially in a communications application. In addition, the loading on buses DBUS, ABUS, CBUS from bus masters $8_0$ through $8_n$ and main processor 2 is likely to be large, requiring that buses ABUS, DBUS, CBUS be implemented physically as split buses, with main processor 2 and DRAM 4 on one set of physical split buses, and bus masters $8_0$ through $8_n$ on the other set. The present invention is also contemplated as having benefit to systems having these and other alternative bus arrangements.

Figure 2:
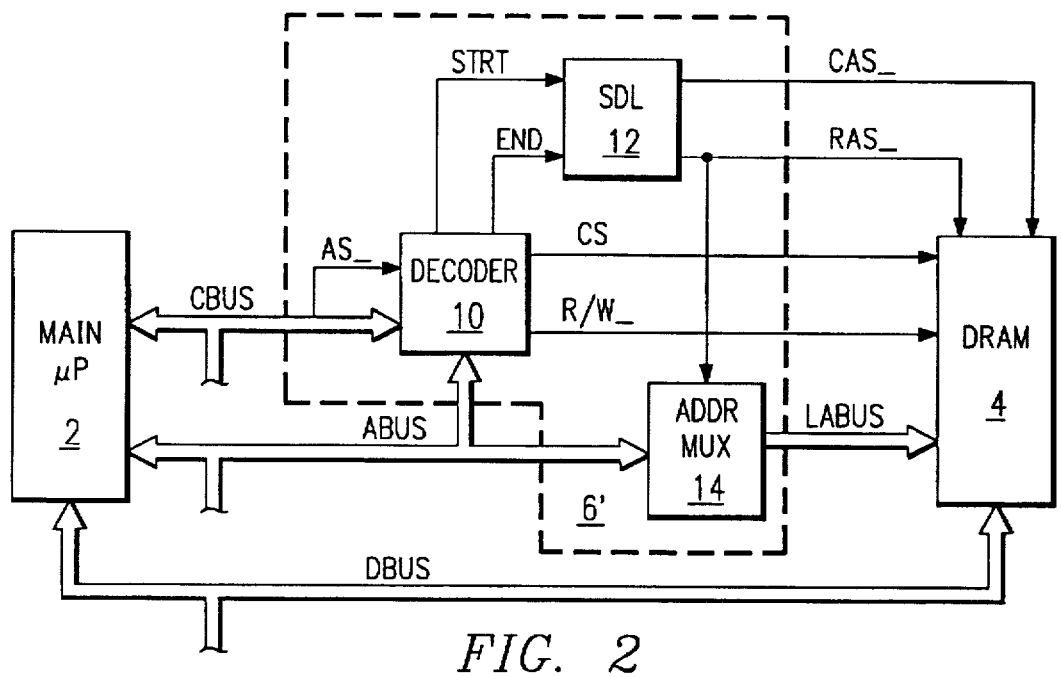
FIG. 2 is an electrical diagram, in block form, of a DRAM access controller constructed according to the prior art.

Referring now to FIG. 2, the construction of DRAM controller 6' according to the prior art will now be described relative to main microprocessor 2 and DRAM 4. An example of a conventional DRAM controller 6' is the 85C090 high speed DRAM controller available from Intel. DRAM controller 6' includes a decoder 10 that receives control signals from control bus CBUS, one of such signals being the address strobe signal AS__ (the __ indicating that the signal is active when at a low logic level). Decoder 10 also receives the address value on address bus ABUS, and determines from this address value if the bus operation is to be an access of DRAM 4; conventionally, the highest order bits of the address value will indicate the type of operation to be performed.

Decoder 10 presents signals on lines START and END to silicon delay line (SDL) 12, which generates the RAS__ and CAS__ strobe signals to DRAM 4 responsive thereto; SDL 12 may be constructed as a shift register, a series of gate delays, or in any other conventional manner. Decoder 10 also generates a chip select signal on line CS and a read/write signal on line R/W__, both presented to DRAM 4 and based on the address value on bus ABUS and control signals on bus CBUS. The chip select signal on line CS may be a conventional chip enable signal for enabling DRAM 4, or alternatively may be an output enable signal (e.g., the G__ signal) that isolates output drivers in DRAM 4 from data bus DBUS when a non-DRAM bus operation is being performed. The signal on line RAS__ is also presented to address multiplexer 14 to select the appropriate row and column address values from address bus ABUS to be presented to DRAM 4 via local address bus LABUS in each cycle.

Signal lines RAS__, CAS__, CS and R/W__ are certain ones of the lines in local control bus LCBUS shown in FIG. 1. It should further be noted that DRAM memory 4 will generally be implemented as a plurality of individual circuits, for example in banks, and as such local control bus LCBUS may consist of multiple ones of signal lines RAS__, CAS__, CS and R/W__, as well as other control signals useful for the control of DRAM memory 4.

This conventional DRAM controller 6' controls the access of DRAM 4 by decoding the address value on address bus ABUS for each bus cycle, responsive to the address strobe signal on line AS__ indicating when each bus cycle is initiated. In the event that the address value on bus ABUS does not indicate that an access of DRAM 4 is to be performed, decoder 10 does not issue a signal on line START to SDL 12; as a result, DRAM 4 will not receive address strobe signals on lines RAS__ and CAS__, and no DRAM operation (internal or otherwise) will be performed.

During non-DRAM cycles, decoder 10 will also set line R/W__ to a high state so that DRAM 4 does not write the data states on data bus 4, and will set line CS to a state so that the output drivers of DRAM 4 are in a high-impedance state, preventing conflict on data bus DBUS.

According to this conventional technology, if the decoding operation by decoder 10 determines that access of DRAM is to be performed, decoder 10 issues an active signal on line START to SDL 12. After the desired delay periods, SDL 12 will present address strobes on lines RAS__ and CAS__ to effect the DRAM access; the active level on line RAS__ will also control address multiplexer 14 to present the row and column addresses on local address bus LABUS at the appropriate times. In addition, decoder 10 will enable DRAM 4, by way of active signals on lines CS and R/W__ according to the type of DRAM access desired. For example, where line CS connects to an output enable terminal G__ as is conventional, a read operation will be enabled by a low logic level on line CS and a high logic level on line R/W__; conversely, to effect a write operation, line CS will be high and line R/W__ will be driven low. The end of the DRAM access is indicated by an active signal from decoder 10 on line END to SDL 12, returning lines RAS__ and CAS__ to high levels and effecting a precharge before the next cycle.

According to the conventional DRAM control illustrated in FIG. 2, however, the overall cycle time required to effect a DRAM operation includes not only the DRAM cycle time itself, but also the time required for decoder 10 to determine whether a DRAM access is to be performed. This is because the address strobe signals on lines RAS__ and CAS__ are not generated until decoder 10 has received and decoded the portion of the address value on address bus ABUS that indicates the type of operation, and issued the signal on line START if a DRAM access is being called. This delay time may be as long as on the order of 60 nsec, and thus may increase the cycle time of a DRAM access by as much as 50% from that of DRAM 4 itself.

Figure 3:
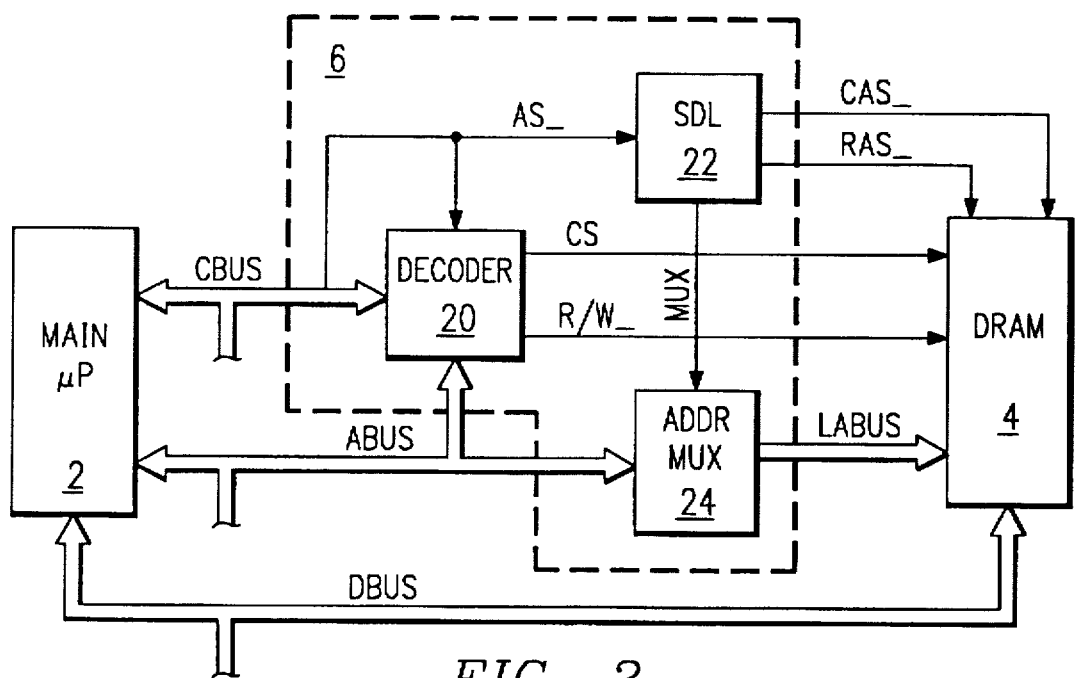
FIG. 3 is an electrical diagram, in block form, of a DRAM access controller constructed according to the preferred embodiment of a portion of a system incorporating the invention.

Referring now to FIG. 3, DRAM controller 6 constructed according to the present invention will now be described in detail. In DRAM controller 6, decoder 20 receives control lines on control bus CBUS and address signals from address bus ABUS, as in the conventional controller of FIG. 2. Decoder 20 in this embodiment of the invention also present signals to DRAM 4 on lines CS and R/W__, depending upon the address value on address bus ABUS and upon certain control signals in control bus CBUS. As noted above, DRAM memory 4 may be constructed in multiple banks, and as such multiple ones of lines CS and R/W__ may be generated by decoder 20.

DRAM controller 22 further includes silicon delay line (SDL) 22 which receives the address strobe line AS__ from control bus CBUS, and which unconditionally generates signals on lines RAS__ and CAS__ to DRAM 4, and on line MUX to address multiplexer 24 responsive to an active transition on line AS__. SDL 22 may be implemented as a shift register, a series of gate delays, or in other conventional ways. As in the conventional DRAM controller 6' noted hereinabove, address multiplexer 24 selects the row address and column address values from address bus ABUS for application to DRAM 4 on local address bus ABUS; the MUX signal from SDL 22 selects the appropriate lines of address bus ABUS (i.e., those corresponding to the DRAM row address or those corresponding to the DRAM column address) for application to the address inputs of DRAM 4.

According to this embodiment of the invention, SDL 22 unconditionally generates RAS__ and CAS__ signals and applies the same to DRAM 4 upon receipt of an address strobe signal on line AS__, delayed by delay stages therewithin, regardless of the type of bus operation that occurs. Initiation of each bus cycle thus initiates a DRAM operation, without requiring the decoding operation to determine the operation type as performed in conventional systems as discussed above relative to FIG. 2. After the DRAM cycle is begun, decoder 20 performs the address decoding function to determine whether the bus operation is a DRAM access, and generates the appropriate signals on lines CS and R/W__ according to such determination. As will be described in further detail hereinbelow, the signals on lines CS and R/W__ may be received by DRAM after the RAS__ and CAS__ signals, without adding to the cycle time. The present invention therefore reduces the cycle time for DRAM access from that of the conventional system of FIG. 2, as the time required to decode the address bus does not delay the initiation of the DRAM cycle.

Figure 4:
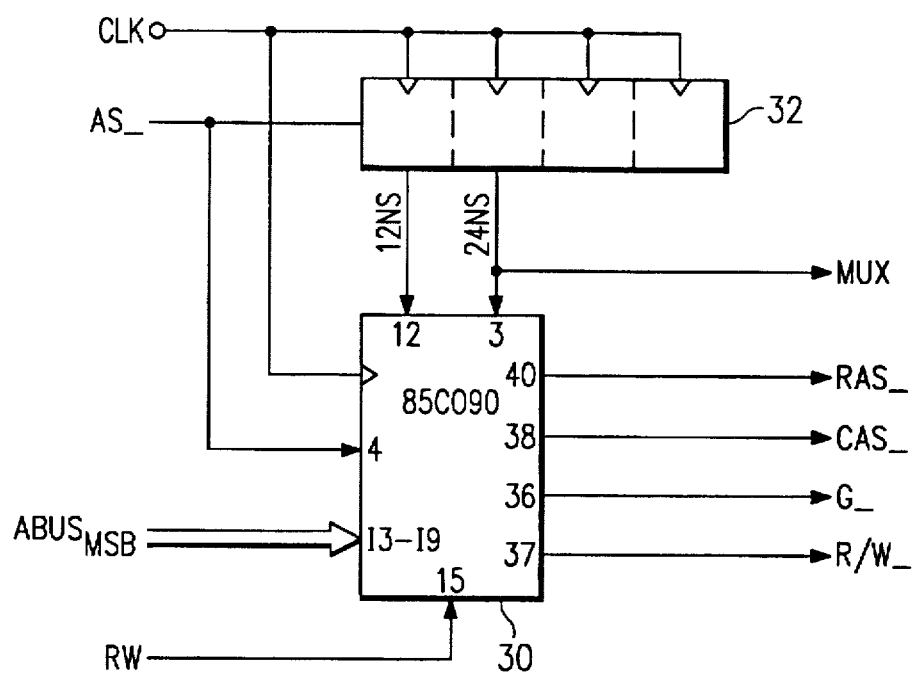
FIG. 4 is an electrical diagram, in block form, illustrating an exemplary implementation of a portion of the DRAM access controller of FIG. 3.

Referring to FIG. 4, an example of a particular implementation of DRAM controller 6 according to the present invention will now be described in detail. In the example of FIG. 4, a conventional DRAM controller 30 (such as the 85C090 high speed DRAM controller noted above) is used to generate the RAS__ and CAS__ strobe signals, but these signals are generated unconditionally responsive to a signal indicating the beginning of a bus operation, such as the address strobe signal on line AS__ from control bus CBUS.

In the example of FIG. 4, 85C090 DRAM controller 30 receives line AS__ at an input (pin 4), as well as the most significant address lines from address bus $ABUS_{MSB}$; these address lines indicate the type of bus operation that is to be performed (i.e., a DRAM access or an operation not involving DRAM 4). Line AS__ is also received at an input of SDL 32, which in this example is a four stage shift register controlled by a high frequency clock on line CLK. SDL 32 has outputs driving lines 12NS and 24NS, respectively, which generate signals that lag the state of line AS__ by 12 and 24 nsec, respectively. Line MUX, coupled to multiplexer 24 in FIG. 2, is driven by line 24NS from SDL 32.

Lines 12NS and 24NS are received by DRAM controller 30 at pins 12 and 3, respectively; lines RAS__ and CAS__ are driven by DRAM controller 30 (at pins 40 and 38, respectively) responsive to signals received on lines 12NS and 24NS, respectively, and in no way responsive to the value on address bus $ABUS_{MSB}$. DRAM controller 30 further generates an output enable signal on line G__ and a read/write signal on line R/W__ responsive to inputs received on address bus ABUS$_{MSB}$, and at pin 15 from a read/write line RW__ in control bus CBUS. In this example, a read operation is enabled by line G__ low and line R/W__ high, while a write operation is enabled by line G__ high and line R/W__ low; external communication of data from or to DRAM 4 is disabled by both lines G__ and R/W__ being high.

Figure 5:
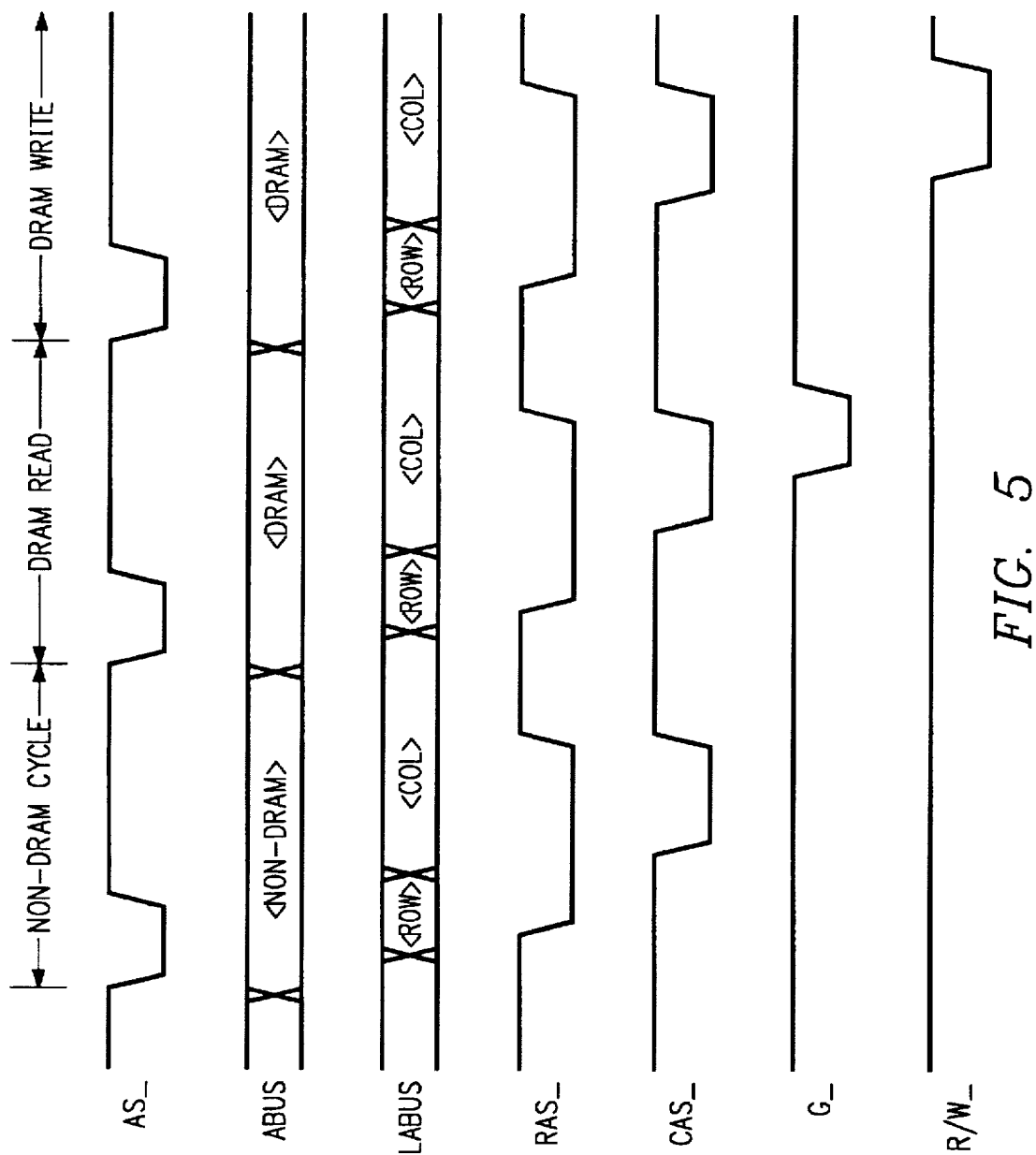
FIG. 5 is a timing diagram illustrating the operation of the DRAM access controller of FIGS. 3 and 4.

Referring now to FIG. 5, the operation of the system described hereinabove according to the preferred embodiment of the invention as shown in FIG. 3, and particularly relative to the example illustrated in FIG. 4, will now be described in detail. This operation will be described relative to a non-DRAM cycle, followed by DRAM read and write cycles.

The first cycle in FIG. 5 is initiated by way line AS__ making a high to low transition; prior to this time, address bus ABUS has stabilized to an address value which, in this case, corresponds to a non-DRAM access bus operation. Responsive to the transition of line AS__, SDL 32 and DRAM controller 30 (in FIG. 4) unconditionally generate the RAS__ and CAS__ signals after the delay periods specified by SDL 32 and DRAM controller 30. In addition, multiplexer 24 is controlled by line MUX to successively apply the row address lines of address bus ABUS and the column address lines of address ABUS to local address bus LABUS at the appropriate times relative to the strobe signals on lines RAS__ and CAS__.

In this first cycle of FIG. 5, however, since the address value on address bus ABUS indicates a bus operation other than a DRAM access, DRAM controller 30 maintains both of lines G__ and R/W__ at high logic levels. DRAM 4 thus is placed in a state where its output drivers are in a high impedance state, and where its input buffers are incapable of receiving data from data bus DBUS. Accordingly, while row and column access operations are performed internally to DRAM 4 (effecting a refresh), such operations do not affect data bus DBUS and are thus transparent to all residents and bus masters 8 connected thereto.

The second cycle of FIG. 5 is a DRAM read operation. As in the prior non-DRAM cycle, the control signals on RAS__ and CAS__, along with the multiplexing of the row and column addresses of address bus ABUS onto local address bus LABUS, are performed unconditionally responsive to the transition on line AS__. However, during the time in which the RAS__ and CAS__ strobes are being generated, DRAM controller 30 has decoded the most significant address bits on address bus ABUS, and determined that this bus operation is a DRAM access. DRAM controller 30 has also received and decoded the appropriate lines of control bus CBUS to determine that the operation is to be a read. Accordingly, DRAM controller 30 pulls line G__ low at the appropriate time in the cycle, while maintaining line R/W__ at a high level, thus enabling DRAM 4 to perform a read from the memory location(s) corresponding to the row and column addresses on local address bus LABUS and to present the read data on data bus DBUS.

The third cycle illustrated in the example of FIG. 5 is a DRAM write operation. As in the case of both the non-DRAM cycle and also the DRAM read cycle, the control signals on RAS__ and CAS__ are generated unconditionally, in combination with the unconditional presentation of the row and column addresses onto local address bus LABUS in time-multiplexed fashion, both responsive to the transition on line AS__. In the case of the DRAM write operation, decoded from the most significant bits of address bus ABUS and from certain control lines of control bus CBUS, DRAM controller 30 has determined that the desired operation is a write, and accordingly presents a low logic level on line R/W__ low and a high logic level on line G__ to DRAM 4 at the appropriate time. These control signals enable DRAM 4 to write the data on data bus DBUS into the memory location(s) corresponding to the row and column addresses on local address bus LABUS.

The DRAM operations shown in FIG. 5 correspond to a normal read operation and a G-controlled write operation, respectively. It is of course contemplated that DRAM controller 30 will control DRAM 4 to perform DRAM operations according to other known cycle types, such as page mode access, hidden refresh cycles, read/write or read/modify/write cycles, and the like, under the control of control bus CBUS and address bus ABUS, in the conventional manner.

In each of such operations, however, the present invention initiates the DRAM cycle unconditionally from the beginning of each bus cycle, rather than waiting for decoding of the bus operation type as is conventionally performed. Accordingly, the system cycle time for a DRAM access does not include the time required for decoding of the bus operation type, and as a result the use of DRAM in the bus-architecture data processing system is available with a reduced performance penalty.

The present invention is thus believed to enable the use of high density, low cost DRAM as the main memory in many types of data processing systems with improved system performance over conventional DRAM control schemes. Indeed, it is contemplated that the present invention can enable the use of low cost, high density DRAM in certain systems which could not afford the cycle time penalty present in conventional DRAM arrangements, and which therefore previously required the use of expensive and power consumptive static RAM as its main memory.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A data processing system, comprising:
   a bus, having data lines, address lines, and control lines;
   a processor, coupled to said bus, for generating a signal on a first one of said control lines indicating an initiation of a bus access cycle, and for presenting an address value on the address lines of said bus;
   a dynamic memory, having address inputs and control inputs, and having a data output coupled to the data lines of said bus; and
   a memory controller, coupled to said address lines and control lines of said bus, and coupled to control inputs of said dynamic memory, for initiating, before determining whether a bus cycle is a memory access and while decoding the address value on said address lines, a cycle of said dynamic memory responsive to said first control line indicating initiation of a bus cycle, and for then enabling communication between the dynamic memory and the data lines of said bus responsive to the address value on said address lines indicating a memory access; and for then inhibiting communication between the dynamic memory and the data lines of said bus responsive to the address value on said address lines not indicating a memory access, wherein the address value is selected irrespective of its location in an address queue.

2. The system of claim 1, wherein said memory controller comprises:

a clock generator, having an input receiving said first control line, and having an output coupled to an address strobe input of said dynamic memory, for presenting an address strobe signal responsive to said first control line indicating an initiation of a bus access cycle; and a decoder, having inputs coupled to said address lines of said bus, and having an output coupled to a chip select input of said dynamic memory, for generating a chip select signal to said dynamic memory responsive to said address lines indicating that the bus access cycle is intended to access said dynamic memory.

3. The system of claim 2, wherein said dynamic memory has multiplexed address inputs;

and wherein said clock generator is for presenting both a row address strobe signal and a column address strobe signal to said dynamic memory responsive to said first control line indicating an initiation of a bus access cycle.

4. The system of claim 3, wherein said clock generator presents a multiplex control signal in response to said first control line indicating an initiation of a bus access cycle, and wherein said memory controller further comprises:

an address multiplexer, having inputs coupled to said address lines of said bus, having a select input coupled to said clock generator, and having outputs coupled to address inputs of said dynamic memory, for communicating row and column address signals from said address lines of said bus to said dynamic memory responsive to said multiplex control signal.

5. The system of claim 2, wherein said dynamic memory is a read/write memory, having a read/write input;

and wherein said decoder is also for generating a read/write signal responsive to said address lines indicating that the bus access cycle is intended to access said dynamic memory and responsive to a second one of said control lines of said bus indicating whether the bus access cycle is to be a read or a write.

6. A method of controlling access to a dynamic memory in a bus architecture data processing system, comprising:

receiving an address strobe signal on a bus indicating initiation of a bus operation;

presenting an address strobe signal to said dynamic memory;

after the presenting step, decoding an address value on said bus and determining whether the bus operation is a memory access; and responsive to the address value decoded in said decoding step corresponding to an address of said dynamic memory, presenting a chip select signal to said dynamic memory, wherein the address value is selected irrespective of its location in an address queue.

7. The method of claim 6, wherein said step of presenting an address strobe signal comprises:

presenting both a row address strobe signal and a column address strobe signal to said dynamic memory responsive to said receiving step.

8. The method of claim 7, further comprising:

responsive to said receiving step, presenting a row address value on said bus to said dynamic memory in combination with said row address strobe signal; and then presenting a column address value on said bus to said dynamic memory in combination with said column address strobe signal.

9. The method of claim 6, further comprising:

receiving a read/write signal on a control line of said bus; and responsive to the address value decoded in said decoding step corresponding to an address of said dynamic memory, also presenting a read signal or a write signal to said dynamic memory corresponding to the read/write signal.

10. The method of claim 6, further comprising:

receiving a read/write signal on a control line of said bus; and wherein said step of presenting a chip select signal comprises:

responsive to the address value decoded in said decoding step corresponding to an address of said dynamic memory and said read/write signal indicating a read operation, presenting an output enable signal to said dynamic memory; and responsive to the address value decoded in said decoding step corresponding to an address of said dynamic memory and said read/write signal indicating a write operation, presenting a write signal to said dynamic memory.

11. The method of claim 10, further comprising:

responsive to the address value decoded in said decoding step not corresponding to an address of said dynamic memory, not generating either said output enable signal or said write signal.

12. A method of accessing memory in a bus architecture data processing system, comprising the steps of:

first, presenting address signals onto a system bus indicating the initiation of a bus cycle, wherein the system bus is connected to a decoder and to dynamic memory;

second, presenting control signals to said dynamic memory to initiate a memory cycle in response to the address signals on the system bus;

third, determining if a memory access is indicated by the address signals on the system bus; and fourth, responsive to the address signals indicating a memory access, enabling said dynamic memory to communicate with a data bus, wherein an address is decoded from the address signals irrespective of the address's queue location.

13. The method of claim 12, wherein said enabling step comprises:

presenting a chip select signal to said dynamic memory.

14. The method of claim 12, further comprising:

wherein said step of presenting address signals onto a system bus indicating the initiation of a bus cycle comprises:

presenting an address strobe control signal that indicates initiation of a bus operation;

and wherein said step of presenting control signals to a dynamic memory to initiate a memory cycle comprises:

responsive to receiving said address strobe control signal that indicates initiation of a bus operation, presenting an address strobe signal to said dynamic memory.

15. The method of claim 14, wherein said step of presenting control signals to a dynamic memory to initiate a memory cycle comprises:

presenting both a row address strobe signal and a column address strobe signal to said dynamic memory responsive to receiving said address strobe control signal that indicates initiation of a bus operation.

16. The method of claim 15, further comprising:

responsive to receiving said address strobe control signal that indicates initiation of a bus operation, presenting a row address value to said dynamic memory in combination with said row address strobe signal; and then presenting a column address value to said dynamic memory in combination with said column address strobe signal.

17. The method of claim 12, further comprising:

receiving a read/write control signal; and after said steps of presenting control signals to said dynamic memory to initiate a memory cycle, and responsive to the address signals indicating a memory access, also presenting a read signal or a write signal to said dynamic memory corresponding to the state of said received read/write control signal.

18. The method of claim 12, further comprising:

receiving a read/write control signal; and wherein said enabling step comprises:

responsive to said read/write control signal indicating a read operation, presenting an output enable signal to said dynamic memory; and responsive to said read/write signal indicating a write operation, presenting a write signal to said dynamic memory.

19. The method of claim 18, further comprising:

after said steps of presenting control signals to said dynamic memory to initiate a memory cycle, and responsive to the address signals not indicating a memory access, not presenting either said output enable signal or said write signal.

* * * * *

UNITED STATES PATENT AND TRADEMARK OFFICE
CERTIFICATE OF CORRECTION

PATENT NO. : 5,778,447

DATED : July 7, 1998

INVENTOR(S) : David W. Kuddes

It is certified that error appears in the above-identified patent and that said Letters Patent are hereby corrected as shown below:

Col. 3, line 16, delete "the-system", insert -- the system --.
Col. 4, line 2, delete "System").", insert -- System." --.
Col. 4, line 6, delete "masters 80", insert -- 8₀ --.
Col. 5, line 39, delete "on line R/W_ conversely", insert -- on line R/W_; conversely --.

Signed and Sealed this

Twenty-ninth Day of December, 1998

Attest:

Attesting Officer

BRUCE LEHMAN

Commissioner of Patents and Trademarks